United States Patent
Li et al.

(10) Patent No.: US 12,373,135 B2
(45) Date of Patent: Jul. 29, 2025

(54) METHOD FOR MANAGING STORAGE SYSTEM, STORAGE SYSTEM, AND COMPUTER PROGRAM PRODUCT

(71) Applicant: HUAWEI TECHNOLOGIES CO., LTD., Guangdong (CN)

(72) Inventors: Bingbing Li, Chengdu (CN); Chunhua Tan, Chengdu (CN); Hao Dong, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/343,355

(22) Filed: Jun. 28, 2023

(65) Prior Publication Data

US 2023/0359397 A1 Nov. 9, 2023

Related U.S. Application Data

(63) Continuation of application No. PCT/CN2021/142415, filed on Dec. 29, 2021.

(30) Foreign Application Priority Data

Dec. 29, 2020 (CN) .......................... 202011602324.4

(51) Int. Cl.
*G06F 3/06* (2006.01)

(52) U.S. Cl.
CPC .......... *G06F 3/0659* (2013.01); *G06F 3/0622* (2013.01); *G06F 3/067* (2013.01)

(58) Field of Classification Search
CPC ...... G06F 3/0659; G06F 3/0622; G06F 3/067; G06F 3/061; G06F 3/0631; G06F 3/0635; G06F 3/0688; G06F 3/0643; G06F 3/0647; G06F 3/0658
See application file for complete search history.

(56) References Cited

U.S. PATENT DOCUMENTS

| | | | |
|---|---|---|---|
| 11,163,500 B2 * | 11/2021 | Hasegawa | G06F 3/0604 |
| 2007/0239655 A1 | 10/2007 | Agetsuma et al. | |
| 2013/0218934 A1 | 8/2013 | Lin et al. | |
| 2014/0006357 A1 | 1/2014 | Davis et al. | |
| 2017/0160982 A1 * | 6/2017 | Altman | G06F 3/0644 |
| 2018/0351870 A1 * | 12/2018 | Chen | G06F 3/0631 |

(Continued)

FOREIGN PATENT DOCUMENTS

| | | |
|---|---|---|
| CN | 102523158 A | 6/2012 |
| CN | 110391995 A | 10/2019 |
| CN | 111309254 A | 6/2020 |

OTHER PUBLICATIONS

International Search Report and Written Opinion in International Appln. No. PCT/CN2021/142415, mailed on Mar. 15, 2022, 12 pages (with English translation).

(Continued)

*Primary Examiner* — Sean D Rossiter
(74) *Attorney, Agent, or Firm* — Fish & Richardson P.C.

(57) ABSTRACT

Example methods and apparatus for managing a storage system are described. The storage system includes a plurality of control nodes. One example method includes receiving a first operation request of a client by a first control node in the plurality of control nodes. The first control node creates a first object on a first storage node based on the first operation request.

16 Claims, 5 Drawing Sheets

A first control node in a plurality of control nodes receives a first operation request of a client — 501

The first control node creates a first object on a first storage node based on the first operation request — 502

(56) References Cited

U.S. PATENT DOCUMENTS

| | | | | |
|---|---|---|---|---|
| 2018/0373615 A1* | 12/2018 | Xia | ................... | G06F 11/3006 |
| 2019/0303254 A1* | 10/2019 | Danilov | .............. | G06F 11/1471 |
| 2019/0370360 A1 | 12/2019 | Mainali et al. | | |
| 2022/0050819 A1* | 2/2022 | Donnelly | ............ | G06F 16/2365 |
| 2022/0164113 A1* | 5/2022 | Hope | ................. | G06F 11/1076 |

OTHER PUBLICATIONS

Extended European Search Report in European Appln. No. 21914483.9, mailed on Apr. 17, 2024, 7 pages.
EP Communication Pursuant to Article 94(3) EPC in European Appln. No. 21914483.9, mailed on May 8, 2025, 10 pages.

* cited by examiner

METHOD FOR MANAGING STORAGE SYSTEM, STORAGE SYSTEM, AND COMPUTER PROGRAM PRODUCT

CROSS-REFERENCE TO RELATED APPLICATIONS

This application is a continuation of International Application No. PCT/CN2021/142415, filed on Dec. 29, 2021, which claims priority to Chinese Patent Application Chinese Patent Application No. 202011602324.4, filed on Dec. 29, 2020. The disclosures of the aforementioned applications are hereby incorporated by reference in their entireties.

TECHNICAL FIELD

The present invention relates to the field of information technologies, and in particular, to a method for managing a storage system, the storage system, and a computing program product.

BACKGROUND

In a storage system with a plurality of control nodes, for example, a storage system supporting network attached storage (NAS), as client access increases, link bandwidth between the control nodes is consumed for forwarding operation requests between control nodes, increasing an access latency.

SUMMARY

According to a first aspect, an embodiment of the present invention provides a method for managing a storage system, where the storage system includes a plurality of control nodes. The method includes:
  a first control node in the plurality of control nodes receives a first operation request of a client; and
  the first control node creates a first object on a first storage node based on the first operation request.

In this embodiment of the present invention, the control node receives the operation request of the client, and locally creates the corresponding object, to obtain optimal performance and latency.

With reference to the first aspect, the method further includes:
  the first control node receives a second operation request of the client; and
  the first control node creates a second object on the first storage node based on the second operation request, where there is an association relationship between the second object and the first object.

With reference to the first aspect, the first object is a first directory, and a second object is a subdirectory of the first directory or a file in the first directory.

With reference to the first aspect, the first control node is an access control node of the client.

With reference to the first aspect, the first control node is a control node on which the first object is located and that is determined according to an object balancing rule.

With reference to the first aspect, the method further includes:
  a second control node in the plurality of control nodes receives a third operation request of the client when a preset condition is met; and
  the second control node creates a third object on a third control node based on the third operation request, where the third object is associated with the first object. In this way, link bandwidth occupied for forwarding operation requests between control nodes and an access latency are reduced, and load balancing between the control nodes is implemented.

With reference to the first aspect, the preset condition is that load of the first control node is greater than a first threshold.

With reference to the first aspect, the preset condition is that a data capacity managed by the first control node is greater than a second threshold.

With reference to the first aspect, the preset condition is that a quantity of directories and/or files managed by the first control node is greater than a third threshold, to be specific, a quantity of associated objects managed by the first control node is greater than the third threshold.

With reference to the first aspect, the preset condition is that load of the first control node is higher than load of the second control node by a fourth threshold.

With reference to the first aspect, the preset condition is that a data capacity managed by the first control node is greater than a data capacity managed by the second control node by a fifth threshold.

With reference to the first aspect, the preset condition is that a quantity of directories and/or files managed by the first control node is greater than a quantity of directories and/or files managed by the second control node by a sixth threshold, in other words, the quantity of associated objects managed by the first control node is greater than a quantity of associated objects managed by the second control node by the sixth threshold.

With reference to the first aspect, the storage system is a file storage system.

With reference to the first aspect, the method further includes:
  the first control node migrates the first object to the third control node in the plurality of control nodes when an access temperature of the first object reaches a preset threshold. Therefore, performance of accessing a hotspot object by the client is ensured.

According to a second aspect, an embodiment of the present invention provides a storage system including a plurality of control nodes, and corresponding control nodes are configured to implement various solutions in the first aspect.

According to a third aspect, an embodiment of the present invention provides a storage node in a storage system. The control node includes an interface and a processor. The interface communicates with the processor, and the processor is configured to implement various solutions in the second aspect.

According to a fourth aspect, an embodiment of the present invention provides a storage node in a storage system. The storage node includes various units configured to implement various implementations of the first aspect.

According to a fifth aspect, an embodiment of the present invention provides a computer program product, including computer program instructions. A computer executes the computer program instructions to perform various solutions in the first aspect.

According to a sixth aspect, an embodiment of the present invention provides a computer-readable storage medium, storing computer program instructions. A computer executes the computer program instructions to perform various solutions in the first aspect.

According to a seventh aspect, an embodiment of the present invention provides a method for managing a storage system. The method includes: A client sends a first operation request to a first control node of the storage system, where the first operation request is used to create a first object; and the client sends a second operation request to the first control node of the storage system, where the second operation request is used to create a second object, and the second object is associated with the first object.

With reference to the seventh aspect, in an implementation, the first control node is a control node of an IP mounted on the client.

With reference to the seventh aspect, in an implementation, the first control node is a control node determined according to a balancing rule of a created object. The object may be a directory, a subdirectory, or the like. The balancing rule may be a hash distribution algorithm, a round-robin scheduling algorithm, or the like.

With reference to the seventh aspect, the first object is a directory, the second object is a subdirectory of the directory, or the second object is a file in the directory.

According to an eighth aspect, an embodiment of the present invention provides a client including various units configured to implement various implementations of the seventh aspect.

According to a ninth aspect, an embodiment of the present invention provides a client including an interface and a processor. The interface communicates with the processor, and the processor is configured to implement various solutions in the seventh aspect.

According to a tenth aspect, an embodiment of the present invention provides a computer program product, including computer program instructions. A computer executes the computer program instructions to perform various solutions in the seventh aspect.

According to an eleventh aspect, an embodiment of the present invention provides a computer-readable storage medium, storing computer program instructions. A computer executes the computer program instructions to perform various solutions in the seventh aspect.

BRIEF DESCRIPTION OF DRAWINGS

To describe the technical solutions in embodiments of this application more clearly, the following briefly describes the accompanying drawings used for describing embodiments.

DESCRIPTION OF EMBODIMENTS

The following describes in detail technical solutions in embodiments of this application.

Figure 1:
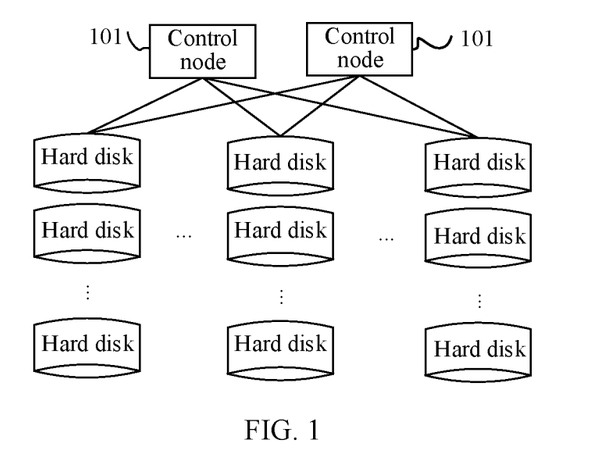
FIG. 1 is a schematic diagram of a storage system according to an embodiment of the present invention.
Figure 2:
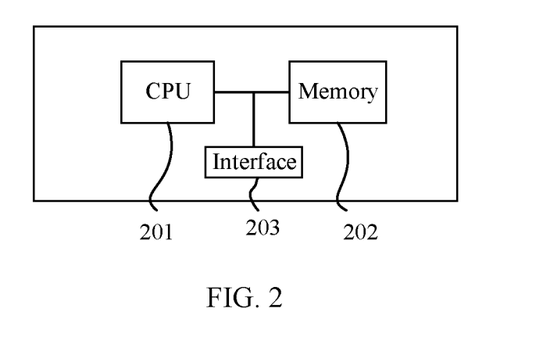
FIG. 2 is a schematic diagram of a structure of a control node of a storage array according to an embodiment of the present invention.

As shown in FIG. 1, a storage system in embodiments of the present invention may be a storage array (for example, Huawei® Oceanstor®18000 series or Huawei® Oceanstor® Dorado® V6 series). The storage array includes a control node 101 and a plurality of hard disks. Usually, the storage array includes a plurality of control nodes 101. The hard disk may be in a disk enclosure of the storage array. The hard disk may be a mechanical disk, a solid-state drive (Solid-State Drive, SSD), or a mechanical disk and an SSD. The hard disk may alternatively be another new medium disk, for example, a storage class memory (Storage Class Memory, SCM) disk. As shown in FIG. 2, the control node 101 includes a central processing unit (Central Processing Unit, CPU) 201, a memory 202, and an interface 203. The memory 202 stores computer program instructions, and the CPU 201 executes the computer program instructions in the memory 202 to manage the storage system and perform operations such as a data access operation and a data recovery operation. In addition, to save computing resources of the CPU 201, a field programmable gate array (Field Programmable Gate Array, FPGA) or other hardware may also be configured to perform all operations of the CPU 201 in embodiments of the present invention, or an FPGA or other hardware and the CPU 201 are separately configured to perform some operations of the CPU 201 in embodiments of the present invention. For ease of description, in embodiments of the present invention, a processor is uniformly used to indicate a combination of the CPU 201 and the memory 202, and the foregoing various implementations. The processor communicates with the interface 203. The interface 203 may be a network interface card (Network Interface Card, NIC) or a host bus adapter (Host Bus Adaptor, HBA).

Figure 3:
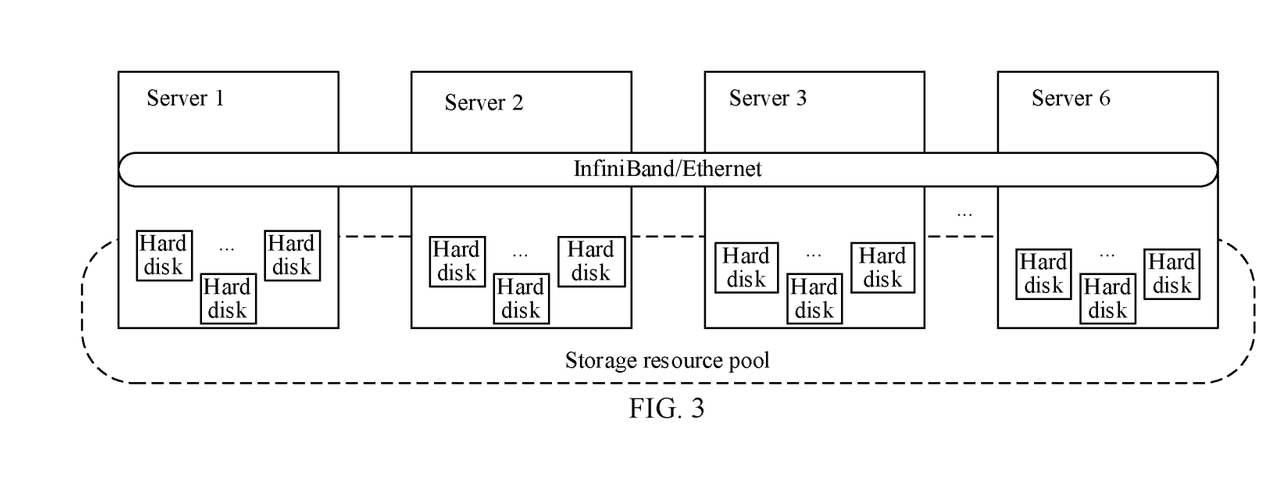
FIG. 3 is a schematic diagram of a distributed storage system according to an embodiment of the present invention.

Further, the storage system in embodiments of the present invention may alternatively be a distributed storage system (for example, Huawei® Fusionstorage® series), or the like. Huawei® Oceanstor® 100D series is used as an example. As shown in FIG. 3, the distributed storage system includes a plurality of servers, such as a server 1, a server 2, a server 3, a server 4, a server 5, and a server 6. The servers communicate with each other through InfiniBand, Ethernet, or the like. The servers contain hard disks. The hard disk may be a mechanical disk, an SSD, or a mechanical disk and an SSD. The hard disk may alternatively be another new medium disk, for example, an SCM disk. In actual application, a quantity of servers in the distributed storage system may be increased based on an actual requirement. This is not limited in this embodiment of the present invention.

Figure 4:
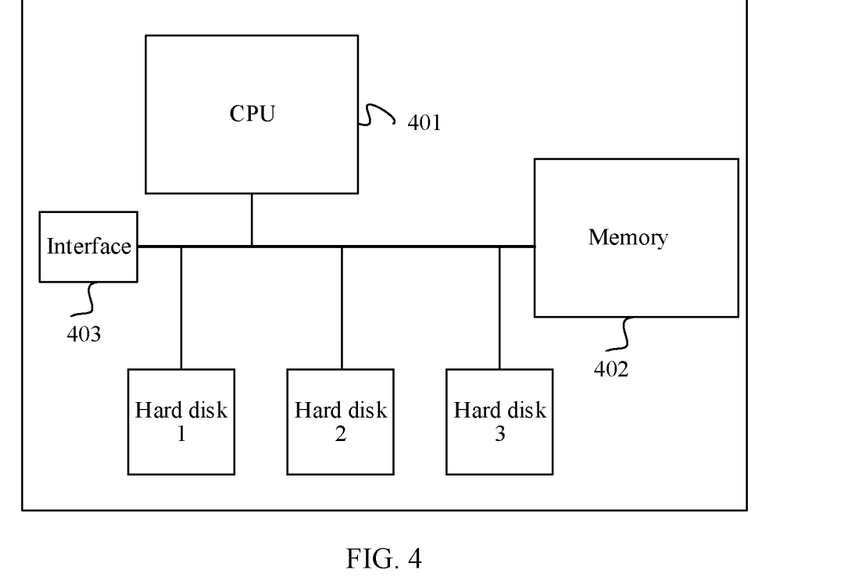
FIG. 4 is a schematic diagram of a structure of a server in a distributed storage system according to an embodiment of the present invention.

The servers in the distributed storage system include a structure shown in FIG. 4. As shown in FIG. 4, each server in the distributed storage system includes a central processing unit (Central Processing Unit, CPU) 401, a memory 402, an interface 403, a hard disk 1, a hard disk 2, and a hard disk 3. The memory 402 stores computer program instructions, and the CPU 401 executes the program instructions in the memory 402 to perform a corresponding operation. The interface 403 may be a hardware interface, for example, a network interface card (Network Interface Card, MC) or a host bus adapter (Host Bus Adaptor, HBA), or may be a program interface module, or the like. In addition, to save computing resources of the CPU 401, a field programmable gate array (Field Programmable Gate Array, FPGA) or other hardware may replace the CPU 401 to perform the foregoing corresponding operation, or an FPGA or other hardware may perform the foregoing corresponding operation together with the CPU 401. For ease of description, in embodiments of the present invention, the CPU 401 and the memory 402, the FPGA and other hardware replacing the CPU 401, or a combination of the FPGA and other hardware replacing the CPU 401 and the CPU 401 are collectively referred to as a processor. The interface 403 may be a network interface card (Network Interface Card, NIC) or a host bus adapter (Host Bus Adaptor, HBA). In the distributed storage system, a server responsible for storage management in the distributed storage system is referred to as a control node. Specifically, the control node is configured to perform storage space management, data access, and the like.

The storage system in the foregoing embodiments of the present invention may provide block-level storage, to be specific, provide a storage area network (Storage Area Network, SAN). Alternatively, the storage system may further provide file-level storage, to be specific, provide network attached storage (Network Attached Storage, NAS), and may further provide object-based storage, or provide at least two of the foregoing three types of storage.

Figure 5:
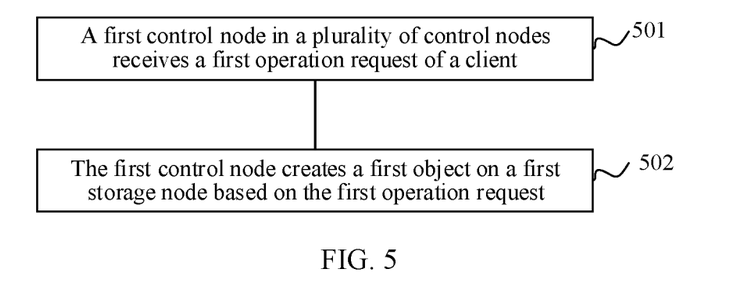
FIG. 5 is a schematic flowchart of an embodiment method according to an embodiment of the present invention.

An embodiment of the present invention provides a method for managing a storage system, where a storage system architecture may be described with reference to the foregoing description. As shown in FIG. 5, the management method includes the following steps.

501: A first control node in a plurality of control nodes receives a first operation request of a client.

502: The first control node creates a first object on a first storage node based on the first operation request.

In this embodiment of the present invention, the control node receives the operation request of the client, and locally creates the corresponding object, to obtain optimal performance and latency.

Further, the first control node receives a second operation request of the client, and creates a second object on the first storage node based on the second operation request, where there is an association relationship between the second object and the first object. In this embodiment of the present invention, that there is an association relationship between the first object and the second object may also described as: there is affinity between the first object and the second object.

In an implementation, the first object is a first directory, and the second object is a lower-level directory or a subdirectory of the first directory, or a file in the first directory.

To further reduce link bandwidth occupied for forwarding operation requests between control nodes and an access latency, the first control node may be an access control node of the client. In other words, the first control node is a control node accessed by the client based on an access address when the client accesses the storage system. In specific implementation, the access address may be an internet protocol (Internet Protocol, IP) address of the first control node. Therefore, the first control node is also referred to as a control node of an IP mounted on the client. In another implementation, the first control node may be an owning control node of the first object. In other words, according to an object balancing rule, the first object belongs to the first control node. For example, a file system distributes directories to each control node according to a directory balancing rule, for example, a hash distribution algorithm, a round-robin scheduling algorithm. The second object associated with the first object is distributed based on an association. To be specific, the first control node creates the second object, and no control node is selected for the second object according to the directory balancing rule. In this embodiment of the present invention, determining a control node on which an object is located according to the object balancing rule is also referred to as determining a control node to which the object belongs according to the object balancing rule, or determining a control node to which the object is distributed according to the object balancing rule.

In this embodiment of the present invention, the client may communicate with the storage system using a protocol, for example, a network file system (Network File System, NFS) protocol or a common internet file system (Common Internet File System, CIF S) protocol.

In this embodiment of the present invention, the access control node of the client processes an operation request of the client. A second control node of the storage system may receive the operation request of the client when a preset condition is met, to create a third object, where the third object is associated with the first object. In an implementation, the first object is the first directory, and the third object is a subdirectory of the first directory or a file in the first directory.

The second control node of the storage system receives the operation request of the client and creates the third object that has an association relationship with the first object. Specifically, the first control node may forward the operation request to the second control node, or a domain name system (Domain Name System, DNS) of the storage system selects the second control node based on load or a running status of each control node, or a control node serving as a node management function of the storage system selects the second control node, to share load of the first control node.

The preset condition may be that the load of the first control node is greater than a first threshold, or a data capacity managed by the first control node is greater than a second threshold, or a quantity of directories and/or files managed by the first control node is greater than a second threshold, or the load of the first control node is greater than load of the second control node by a fourth threshold, or the data capacity managed by the first control node is greater than a data capacity managed by the second control node by a fifth threshold, or the quantity of directories and/or files managed by the first control node is greater than a quantity of directories and/or files managed by the second control node by a sixth threshold.

In the foregoing embodiment of the present invention, the first control node migrates the first object to a third control node in the plurality of control nodes when an access temperature of the first object reaches a preset threshold.

In this embodiment of the present invention, an example in which a storage array provides file storage is used for description. In this embodiment of the present invention, the storage array includes a plurality of control nodes. The storage array provides a distributed file system. A directory and a subfile of the directory preferentially belong to a same control node to perform I/O processing, avoid forwarding across control nodes and improve performance in scenarios such as a directory traversal query, an attribute traversal query, and batch attribute configuration.

Figure 6:
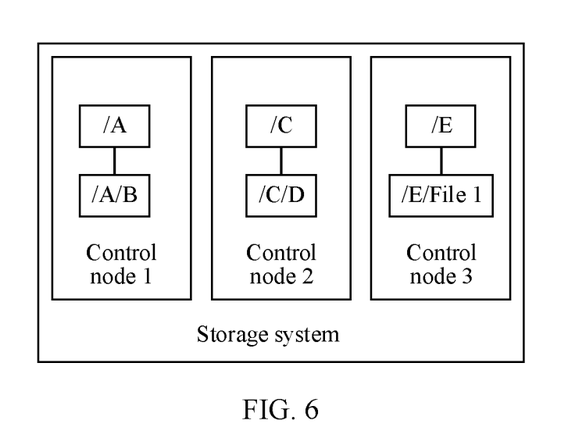
FIG. 6 is a schematic diagram of an association relationship between objects according to an embodiment of the present invention.

The client sends an operation request to the storage system to create a directory. After receiving the operation request, a control node in the storage system locally creates a directory for the client. For a subsequent operation request sent by the client, for example, creating a lower-level directory, a subdirectory, or a file in the directory, the control node also locally creates a corresponding lower-level directory, a subdirectory, or a file, to obtain optimal performance and an optimal latency. As shown in FIG. 6, a directory/A is created on a control node 1, and a subdirectory/A/B of the directory/A is also created on the control node 1. A directory/C is created on a control node 2, and a subdirectory/C/D of the directory/C is also created on the control node 2. A directory/E is created on a control node 3. A file 1 in a directory/2 is also created on the control node 1. In this embodiment of the present invention, a directory is associated with a subdirectory or a file in the directory. The control node 1 in FIG. 6 is used as an example. In an implementation, the control node 1 may be an access control node of the client. The client sends an operation request for creating the directory/A, and the control node 1 locally creates the directory/A. The client sends an operation request of the subdirectory/A/B, and the control node 1 still locally creates the subdirectory/A/B. The operation request of the client is preferentially executed by the client from a control node of an IP mounted on the client to obtain the optimal performance and an optimal latency. The storage system may dynamically adjust an operation request allocation proportion based on the preset condition. For example, when load of a control node, a data capacity managed by the control node, or a quantity of directories and/or files managed by the control node is higher than that of another control node by a specific threshold, the storage system automatically increases an allocation proportion of the another control node, to balancing load and a management capacity of each control node.

In another implementation, the control node 1 shown in FIG. 6 is still used as an example. The client sends the operation request for creating the directory/A, and determines, according to the directory balancing rule, that the directory/A is on the control node 1, and the control node 1 creates the directory/A. In other words, in this scenario, the control node 1 is not the access control node of the client, but the directory/A is created on the control node 1 according to the directory balancing rule. When the client sends the operation request for creating the subdirectory/A/B, the storage system does not select a control node for creating the subdirectory/A/B according to the directory balancing rule. Instead, the storage system locally creates the subdirectory/A/B associated with the directory/A on the control node 1. This ensures balancing condition between control nodes in the storage system, further meets affinity between objects, and reduces cross-control node access. Therefore, access performance is increased, and an access latency is reduced.

The control node 1 shown in FIG. 6 is used as an example. The control node 1 migrates the subdirectory/A/B to the control node 2 when an access temperature of the subdirectory/A/B reaches a preset threshold, for example, as a subdirectory in the directory/C, that is, /C/B. Therefore, performance of accessing a hotspot object by the client is ensured. In this embodiment of the present invention, a file whose access temperature reaches a specific threshold in the directory/A may also be migrated to another control node. In this embodiment of the present invention, the directory/A may also be migrated to another control node when an access temperature of the directory/A reaches the specific threshold.

To ensure load balancing of each control node, in an implementation, a quantity of associated objects in one control node may be set. For example, if the quantity of directories and/or files in the directory/A of the control node 1 does not exceed 1000, the files and/or the directories in the directory/A are created on the control node 1; if the quantity exceeds 1000, the directories and/or the files in the directory/A are created on another control node. Alternatively, a quantity of objects managed by the control node 1 is compared with a quantity of objects managed by another control node, to determine whether to continue to create associated objects on the control node 1.

In another implementation, a quantity of associated objects created on the control node 1 may be determined based on load of the control node 1, for example, based on CPU load of the control node 1. Specifically, average CPU load may be calculated based on load of CPUs on the control node 1 and used as load of the control node 1, to compare load of control nodes and determine the quantity of associated objects created on the control node 1. Alternatively, CPU load of a control node is compared with a CPU load threshold to determine the quantity of associated objects created on the control node 1.

In another implementation, whether to continue to create the quantity of associated objects on the control node 1 may be determined based on comparison between a data capacity managed by the control node 1 and a data capacity threshold or comparison between the data capacity managed by the control node 1 and a capacity on another control node. The data capacity managed by the control node 1 may be an average capacity, a total capacity, or the like of storage capacities of storage process objects managed by the control node 1. This is not limited in this embodiment of the present invention.

In this embodiment of the present invention, a control node includes a plurality of processors, for example, a CPU. The control node locally creates a corresponding object based on an operation request. Specifically, the corresponding object may be created by a CPU corresponding to the control node, or the corresponding object may be created by a physical core corresponding to a CPU in the control node. In this embodiment of the present invention, a plurality of associated objects may be distributed on different CPUs or different physical cores of a same control node, to implement balancing inside the control node. In an implementation, in this embodiment of the present invention, control nodes in the storage system may be used as resources to form a corresponding resource pool, and a corresponding virtual control node is provided for the client. The virtual control node is mapped to a corresponding CPU or physical CPU core of the control node, to fully utilize computing resources of the control node. In another implementation, selection may be performed on different virtual nodes on a same control node, to implement balancing inside one control node.

Figure 7:
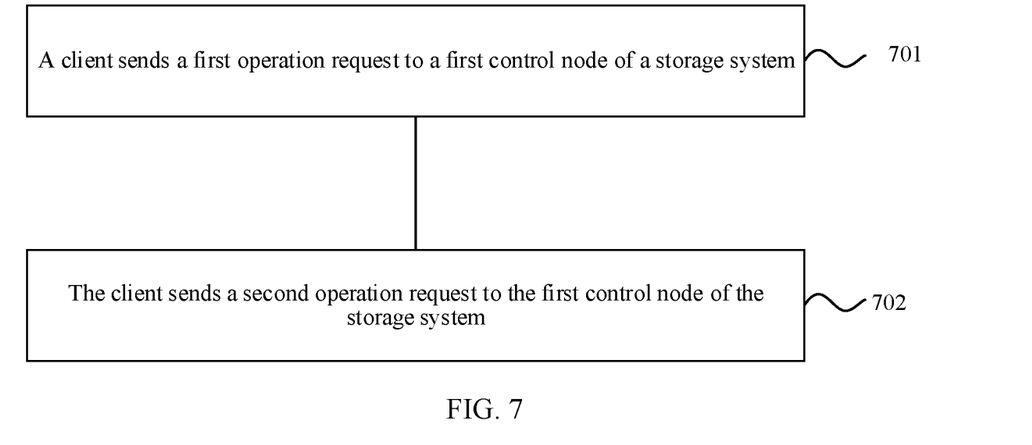
FIG. 7 is a schematic flowchart of a method according to an embodiment of the present invention.

Correspondingly, an embodiment of the present invention further provides a method for managing a storage system. As shown in FIG. 7, the method includes:

701: A client sends a first operation request to a first control node of a storage system.

The first operation request is used to create a first object.

In an implementation, the first control node is a control node of an IP mounted on the client. In another implementation, the first control node is a control node determined according to a balancing rule of a created object. The object may be a directory, a subdirectory, or the like. The balancing rule may be a hash distribution algorithm, a round-robin scheduling algorithm, or the like.

702: The client sends a second operation request to the first control node of the storage system.

The second operation request is used to create a second object, and the second object is associated with the first object. For example, the first object is a directory, the second object is a subdirectory of the directory, or the second object is a file in the directory.

Figure 8:
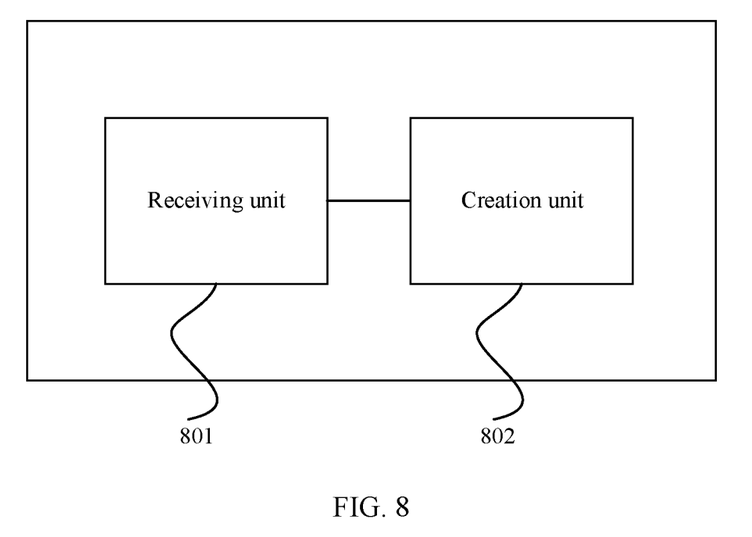
FIG. 8 is a schematic diagram of a structure of a control apparatus according to an embodiment of the present invention.

Correspondingly, an embodiment of the present invention further provides a control apparatus. As shown in FIG. 8, the control apparatus is used in a control node in a storage system, and includes a receiving unit 801 and a creation unit 802. The receiving unit 801 is configured to receive a first operation request of a client. The creation unit 802 is configured to create a first object on a first storage node based on the first operation request. Further, the receiving unit 801 is further configured to receive a second operation request of the client. The creation unit 802 is further configured to create a second object on the first storage node based on the second operation request, where there is an association relationship between the second object and the first object.

Further, the control apparatus further includes a migrating unit, configured to migrate the first object to a third control node in a plurality of control nodes when an access temperature of the first object reaches a preset threshold. The control apparatus provided in this embodiment of the present invention may be implemented in a software manner. In another implementation, the control apparatus may be implemented by hardware. In another manner, the control apparatus may be implemented by combining software and hardware. For specific functions of the control apparatus, refer to the foregoing description in embodiments of the present invention. Details are not described herein again.

Figure 9:
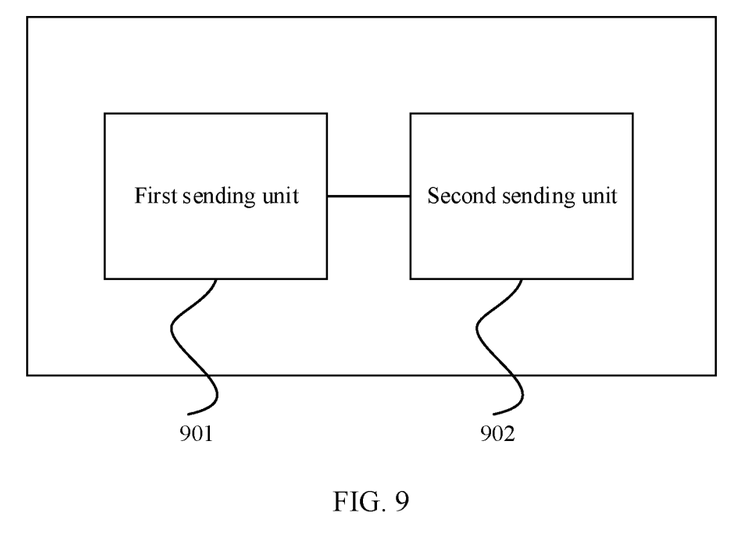
FIG. 9 is a schematic diagram of a structure of a client according to an embodiment of the present invention.

As shown in FIG. 9, an embodiment of the present invention further provides a client, including a first sending unit 901 and a second sending unit 902. The first sending unit 901 is configured to send a first operation request to a first control node of a storage system, where the first operation request is used to create a first object. The second sending unit 902 is configured to send a second operation request to the first control node of the storage system, where the second operation request is used to create a second object, and the second object is associated with the first object.

In an implementation, the first control node is a control node of an IP mounted on the client. In another implementation, the first control node is a control node determined according to a balancing rule of a created object. The object may be a directory, a subdirectory, or the like. The balancing rule may be a hash distribution algorithm, a round-robin scheduling algorithm, or the like. For example, the first object is a directory, the second object is a lower-level directory or a subdirectory of the directory, or the second object is a file in the directory.

Specifically, the client shown in FIG. 9 may be implemented by software, or may be implemented by hardware, or may be implemented by software and hardware.

An embodiment of the present invention provides a computer program product including computer program instructions. When the computer program instructions are run on the corresponding control node 101 shown in FIG. 1 or the control node shown in FIG. 4, the method in embodiments of the present invention is implemented.

An embodiment of the present invention provides a computer program product including computer program instructions. When the computer program instructions are run on a computer, the method in embodiments of the present invention is implemented.

An embodiment of the present invention further provides a non-volatile readable storage medium. The non-volatile readable storage medium includes computer program instructions. When the computer program instructions are run on a computer, the method in embodiments of the present invention is implemented.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present invention, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in the form of a software product. The computer software product is stored in a storage medium and includes several computer program instructions for instructing a computer device (which may be a personal computer, a server, a network device, or the like) to perform all or some of the steps of the methods described in the embodiments of the present invention. The storage medium includes any medium that can store the computer program instructions, for example, a USB flash drive, a removable hard disk, a read-only memory (read-only memory, ROM), a random access memory (random access memory, RAM), a magnetic disk, or a compact disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing a storage system, wherein the storage system comprises a plurality of control nodes, and the method comprises:
   receiving, by a first control node in the plurality of control nodes, a first operation request of a client;
   creating, by the first control node, a first object on a first storage node based on the first operation request, wherein the first object is a first directory; and
   when an access temperature of the first object reaches a preset threshold, migrating, by the first control node, the first object to a third control node in the plurality of control nodes.

2. The method according to claim 1, wherein the method further comprises:
   receiving, by the first control node, a second operation request of the client; and
   creating, by the first control node, a second object on the first storage node based on the second operation request, wherein there is an association relationship between the second object and the first object.

3. The method according to claim 2, wherein the second object is a subdirectory of the first directory or a file in the first directory.

4. The method according to claim 1, wherein the first control node is an access control node of the client.

5. The method according to claim 1, wherein the first control node is a control node on which the first object is located, and the first control node is determined according to an object balancing rule.

6. The method according to claim 1, wherein the method further comprises: when a preset condition associated with the first control node is met, receiving, by a second control node in the plurality of control nodes, a third operation request of the client, and wherein the preset condition is any one of following:
   load of the first control node is greater than a first threshold;
   a data capacity managed by the first control node is greater than a second threshold;
   a quantity of directories and/or files managed by the first control node is greater than a third threshold;
   a load of the first control node is higher than a load of the second control node by a fourth threshold;
   a data capacity managed by the first control node is greater than a data capacity managed by the second control node by a fifth threshold; or
   at least one of a quantity of directories or files managed by the first control node is greater than at least one of a quantity of directories or files managed by the second control node by a sixth threshold.

7. The method according to claim 1, wherein the storage system is a file storage system.

8. A storage system, wherein the storage system comprises a plurality of control nodes, wherein a first control node in the plurality of control nodes comprises:
   at least one first processor; and
   one or more first memories coupled to the at least one first processor and storing first programming instructions for execution by the at least one first processor to:
   receive a first operation request of a client;
   create a first object on a first storage node based on the first operation request, wherein the first object is a first directory; and
   when an access temperature of the first object reaches a preset threshold, migrate the first object to a third control node in the plurality of control nodes.

9. The storage system according to claim 8, wherein the one or more first memories store the first programming instructions for execution by the at least one first processor to:
   receive a second operation request of the client; and
   create a second object on the first storage node based on the second operation request, wherein there is an association relationship between the second object and the first object.

10. The storage system according to claim 9, wherein the second object is a subdirectory of the first directory or a file in the first directory.

11. The storage system according to claim 8, wherein the first control node is an access control node of the client.

12. The storage system according to claim 8, wherein the first control node is a control node on which the first object is located, and the first control node is determined according to an object balancing rule.

13. The storage system according to claim 8, wherein a second control node in the plurality of control nodes comprises at least one second processor and one or more second memories coupled to the at least one second processor, wherein the one or more second memories store second programming instructions for execution by the at least one second processor to receive a third operation request of the client when a preset condition is met, and wherein the preset condition is one of following:
   load of the first control node is greater than a first threshold;
   a data capacity managed by the first control node is greater than a second threshold;
   a quantity of directories and/or files managed by the first control node is greater than a second threshold;
   a load of the first control node is higher than a load of the second control node by a fourth threshold;
   a data capacity managed by the first control node is greater than a data capacity managed by the second control node by a fifth threshold; or
   at least one of a quantity of directories or files managed by the first control node is greater than at least one of a quantity of directories or files managed by the second control node by a sixth threshold.

14. The storage system according to claim 8, wherein the storage system is a file storage system.

15. A non-transitory computer-readable storage medium, used in a storage system comprising a plurality of control nodes, wherein the non-transitory computer-readable storage medium stores computer program instructions that, when executed by a first control node in the plurality of control nodes, cause the first control node to:
   receive a first operation request of a client;
   create a first object on a first storage node based on the first operation request, wherein the first object is a first directory; and
   when an access temperature of the first object reaches a preset threshold, migrate the first object to a third control node in the plurality of control nodes.

16. The non-transitory computer-readable storage medium according to claim 15, wherein the non-transitory computer-readable storage medium stores the computer program instructions that, when executed by the first control node in the plurality of control nodes, cause the first control node to:
   receive a second operation request of the client; and
   create a second object on the first storage node based on the second operation request, wherein there is an association relationship between the second object and the first object.

* * * * *